United States Patent [19]

Saito

[11] 4,290,567
[45] Sep. 22, 1981

[54] TAPE CASSETTE BRAKE ASSEMBLY

[75] Inventor: Kenzo Saito, Izumi, Japan

[73] Assignee: Sony Corporation, Tokyo, Japan

[21] Appl. No.: 42,044

[22] Filed: May 24, 1979

Related U.S. Application Data

[63] Continuation of Ser. No. 927,129, Jul. 21, 1978.

[30] Foreign Application Priority Data

Jul. 22, 1977 [JP] Japan .................................. 52-97064

[51] Int. Cl.³ ............................................. G11B 23/10
[52] U.S. Cl. .................................... 242/198; 242/199
[58] Field of Search ................. 242/71.2, 76, 197–200; 360/96, 132; 226/146–151

[56] References Cited

U.S. PATENT DOCUMENTS 2,894,700 7/1959 Roberts et al. ...................... 242/200
3,797,779 3/1974 Esashi et al. ........................ 242/199

Primary Examiner—Leonard D. Christian
Attorney, Agent, or Firm—Lewis H. Eslinger; Alvin Sinderbrand

[57] ABSTRACT

In a cassette for use in a magnetic recording and/or reproducing apparatus and which is of the type having a housing containing freely rotatable reels having magnetic tape wound thereon with the tape extending between said reels being guided to direct a run thereof across an access opening in said housing, an improved brake assembly is provided for automatically preventing excess slackness in the run of tape when the cassette is disengaged from the magnetic recording and/or reproducing apparatus and for automatically releasing the tape run when the cassette is so engaged. A holder having a resiliently flexible element slidably disposed in a gap provided therein is arranged with respect to a support element such that the free end portion of the element preferably having a low coefficient of friction normally urges a tape portion into pressing contact with the support element so as to provide the braking action. When the tape run is drawn out of the access opening or otherwise tensioned, however, the element is flexed thereby such that only the free end portion having the low coefficient of friction is in sliding contact with the tape, whereby the automatic release action is provided.

19 Claims, 22 Drawing Figures

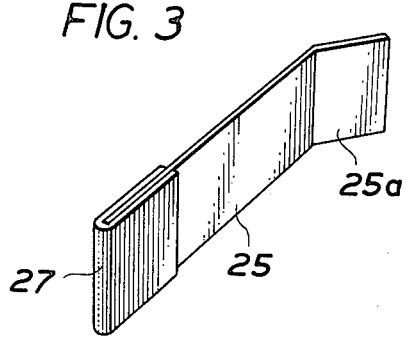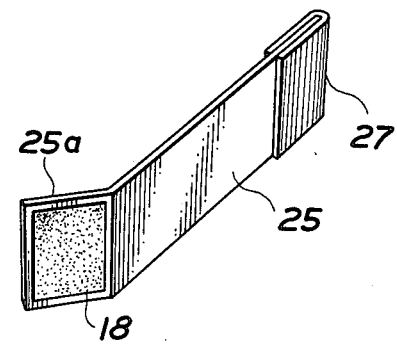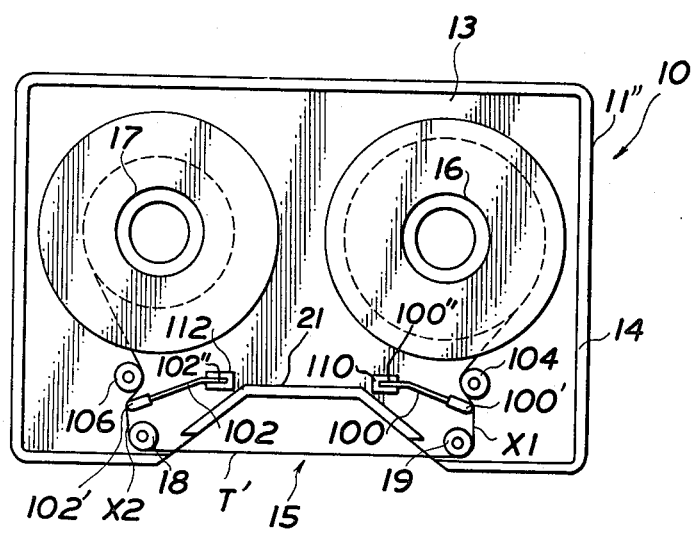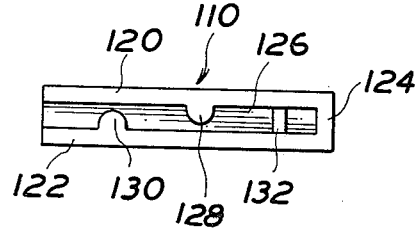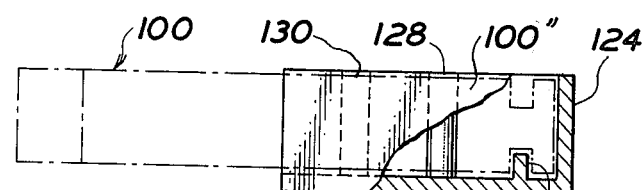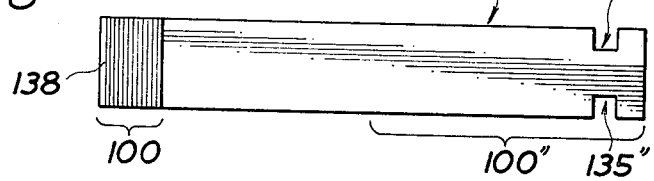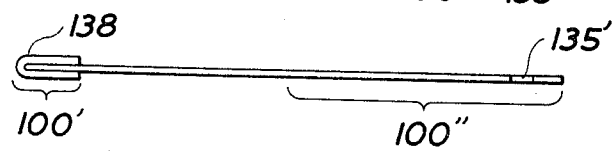

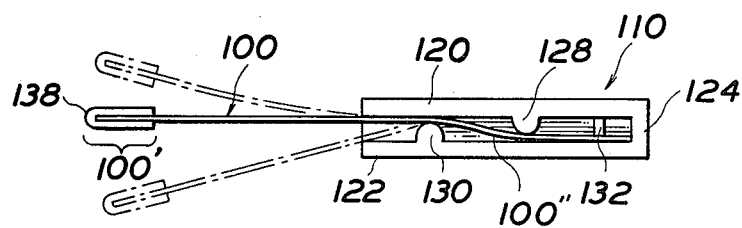
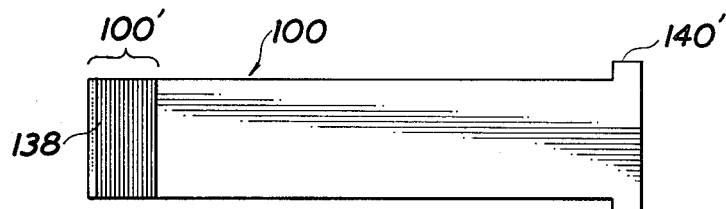
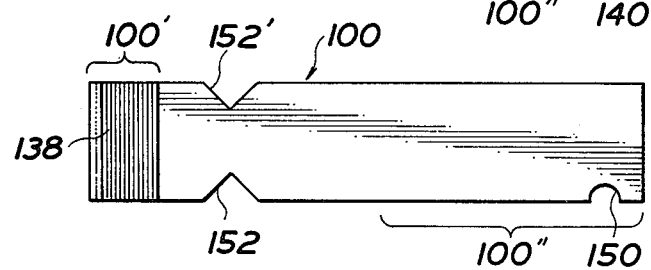
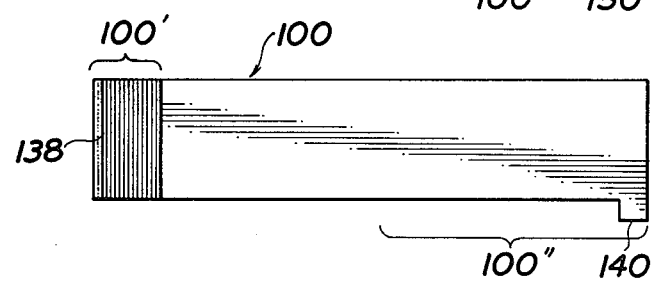
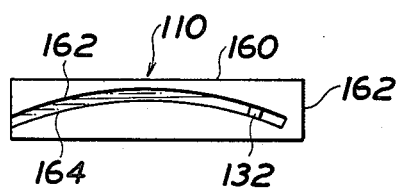
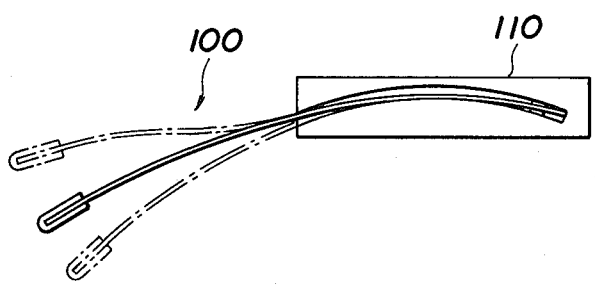
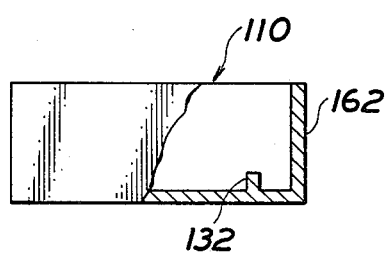

TAPE CASSETTE BRAKE ASSEMBLY

This is a continuation, of application Ser. No. 927,129, filed July 21, 1978.

BACKGROUND OF THE INVENTION

1. Field of the Invention

The present invention relates generally to tape cassettes for use in magnetic recording and reproducing apparatus, and more particularly, to a tape cassette of the type in which the tape is wound on and is guided between freely rotatable reels in the cassette housing. Specifically, the present invention is directed to improved elements for preventing undue slackness in the run of the tape extending across the opening of the casette housing when the casette is removed from the magnetic recording and/or reproducing apparatus and for providing automatic release of the run of the tape during recording and reproducing operation of such apparatus.

2. Description of the Prior Art

Tape cassettes for use in magnetic recording and/or reproducing apparatus are well known in the art. Particularly in the case of tape cassettes used in video recording and/or reproducing apparatus, it is necessary for proper recording and reproducing operations to withdraw the magnetic tape from within the cassette housing and to wrap or load the withdrawn tape about at least a portion of the periphery of the guide drum adjacent the rotary magnetic head which scans skewed record tracks on the tape as the tape is moved about the guide drum.

The required removal of the magnetic tape from within the cassette housing, however, creates several problems. When, for example, the tape cassette is loaded into a video recording and/or reproducing apparatus having an automatic loading device, the tape engaging member of the automatic loading device extends into the opening of the cassette housing to engage the tape. When the tape is engaged, the engaging member is actuated or moved in a path that extends out of the tape cassette housing and ends with the magnetic tape wrapped or loaded about the guide drum. Thus, the magnetic tape must be freely drawn out of the opening in the casette when the engaging member of the automatic loading device is operated. Moreover, the magnetic tape must be freely drawn out of the opening in the cassette during either the record or reproduction mode.

While the magnetic tape must be freely drawn out of the opening during either the loading, record, or reproduction mode, as described above, excessive looseness or slackness in the run of the magnetic tape is disadvantageous. Excessive looseness or slackness in the run of the magnetic tape causes the magnetic tape not to follow a substantially straight path between the guides provided within the cassette housing at opposite sides of the opening. Thus, the excessive looseness or slackness in the magnetic tape run causes the magnetic tape not to be properly engaged by the magnetic head or by the tape engaging member of the tape loading device, which often leads to damage of the magnetic tape or defective recording or reproducing operations. Moreover, excessive looseness or slackness of the magnetic tape often leads to damage of the extended run of magnetic tape during storage or non-use of the tape cassette.

There are several known approaches for preventing excessive looseness or slackness of the extended run of magnetic tape of the tape cassette. One approach is to provide the tape cassette or magazine with brakes for holding taut or preventing undue slackness in the run of magnetic tape. Such approach was disclosed in U.S. Pat. No. 2,894,700.

Another approach is disclosed in U.S. Pat. No. 3,797,779, assigned to the assignee of the present invention. In U.S. Pat. No. 3,797,779, as shown in FIGS. 1 to 3, slackening of the tape run $T_1$ which traverses the opening 15 of the cassette housing 11 as a result of free turning of the tape reels 16, 17 within the cassette housing 11 when the cassette 10 is apart from the magnetic recording and/or reproducing apparatus, is avoided by providing resiliently flexible elements 24, 25, each being fixed at one end within the cassette housing 11. Specifically, resiliently flexible elements 25, 24 each have an end portion 25a or 24a cemented or otherwise suitably secured to partition 21 or 21', respectively, as shown in FIG. 2. Alternatively, resiliently flexible elements 25, 24a are secured by an adhesive provided on the end portions 25a, 24, respectively, as designated by reference numeral 18 in FIG. 4. The resiliently flexible elements 25, 24, in this case, are secured to the partitions 21, 21', respectively, by the peeling off of the release paper provided over adhesive portions 18 and by manually positioning and contacting the end portions 25a, 24a with the respective partitions 21, 21'.

After the resiliently flexible elements 25, 24 have been secured to the respective partitions 21, 21', the free ends of elements 25, 24 engage their respective portions of the tape between a respective one of the tape reels 16, 17 and the tape run T' for urging the respective tape portion into a relatively tortous path in which the tape is engaged by a fixed surface, which may be on guide members 26, 18, respectively. The tortuous paths impose an increased resistance to movement of the tape into the tape run. Each resiliently flexible element 25, 24 is deflected in response to tension in the respective engaged tape portion to permit the latter to follow a relatively less tortuous path in which the resistance to movement of the tape is reduced to free substantially the tape for transfer between the reels.

The use of the resiliently flexible elements 25, 24 to prevent excessive looseness or slackness of the extended run of magnetic tape of the tape cassette exhibits several major deficiencies. The fastening of the end portions 25a, 24a to the partitions 21, 21' is not reliable over a long time period primarily because of drying of the adhesive or cement used to fasten the end portions 25a, 24a to the partitions 21, 21'. The pressure, for example, finger pressure, used when the end portions 25a, 24a are fastened to the partitions 21, 21' inherently is not of a constant value from end portion to end portion. Leakage of adhesive or cement from the sides of the end portions 25a, 24a to the inside of the cassette causes contamination of the magnetic tape. Leakage of adhesive or cement is very difficult to prevent, especially over a long period of time. Exact positioning of the end portions 25a, 24a with the partitions 21, 21' when the end portions 25a, 24 are attached to the partitions 21, 26 is difficult to achieve. Because the end portions 25a, 24a must be exactly positioned with the partitions 21, 21', fabrication is not suitable for automatic machine assembly. In addition, the required fastening of the end portions 25a, 24a with the partitions 21, 21' is expensive to perform, and requires complex manual fabrication steps.

SUMMARY OF THE INVENTION

It is the object of the present invention to provide an improved brake for a cassette which does not exhibit the above-noted deficiencies present in conventional cassette brakes and the like.

More particularly, it is an object of this invention to provide, in a cassette for use in a magnetic recording and/or reproducing apparatus and which is of the type having a housing containing freely rotatably reels having magnetic tape wound thereon with the tape extending between said reels being guided to direct a run thereof across an access opening in said housing, an improved brake for automatically preventing excess slackness in the run of tape when the cassette is disengaged from the magnetic recording and/or reproducing apparatus and for automatically releasing the tape run when the cassette is so engaged.

In accordance with an aspect of this invention, a holder having a resiliently flexible element slidably disposed in a gap provided therein is arranged with respect to a support element such that the free end portion of the resiliently flexible element, preferably having a low coefficient of friction, normally urges a tape portion into pressing contact with the support element so as to provide the braking action. When the tape run is drawn out of the access opening, however, the element is flexed thereby such that the free end portion having the low coefficient of friction is only in sliding contact with the tape, whereby the automatic release action is provided.

BRIEF DESCRIPTION OF THE DRAWINGS

FIGS. 3 and 4 are enlarged perspective views of one of the elements included in the brake assembly of FIG. 2;

FIG. 5 is a top plan view of the bottom half of a cassette having one embodiment according to the brake assembly of the present invention;

FIG. 6 is an enlarged top plan view of a first embodiment of the holder;

FIG. 7 is a side view partially in cross-section of the first embodiment of the holder;

FIGS. 8 and 9 are side and top views, respectively of a first embodiment of the resiliently flexible element according to the present invention;

FIG. 10 is a top plan view of the first embodiment of the holder as shown in FIG. 7 with the first embodiment of the resiliently flexible element of FIGS. 8, 9 slidably disposed therein;

FIG. 11 is a side view of an alternate version of the first embodiment of the resiliently flexible element;

FIG. 12 is a side view of a second embodiment of the resiliently flexible element;

FIG. 13 is a side view of an alternate version of the first embodiment of the resiliently flexible element;

FIGS. 14 and 15 are a top plan view and a side view partially in cross-section of a second embodiment of the holder;

FIG. 16 is a top plan view of the holder of FIGS. 14 and 15 with a resiliently flexible element slidably disposed therein;

DETAILED DESCRIPTION OF THE PREFERRED EMBODIMENTS

Figure 1:
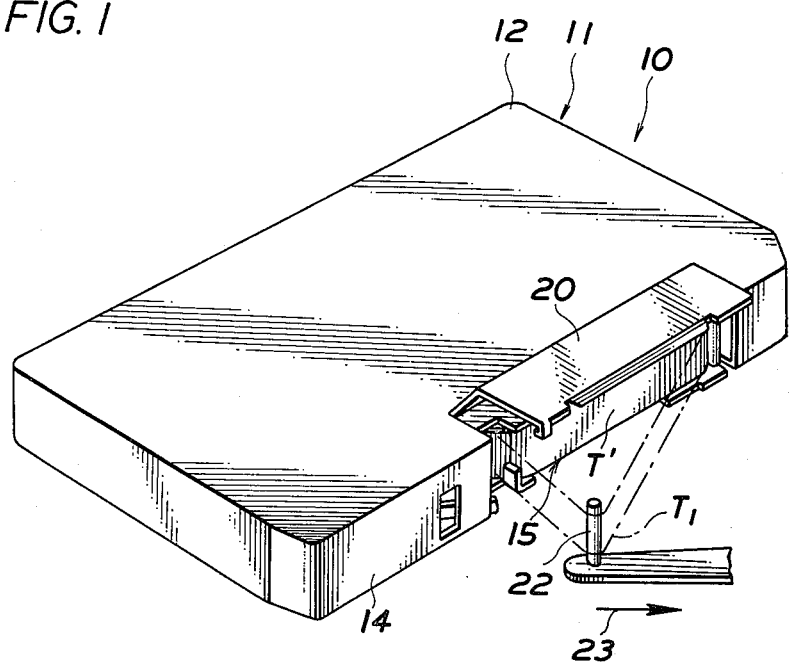
FIG. 1 is a perspective view of a tape cassette of the type to which the present invention may be advantageously applied.
Figure 2:
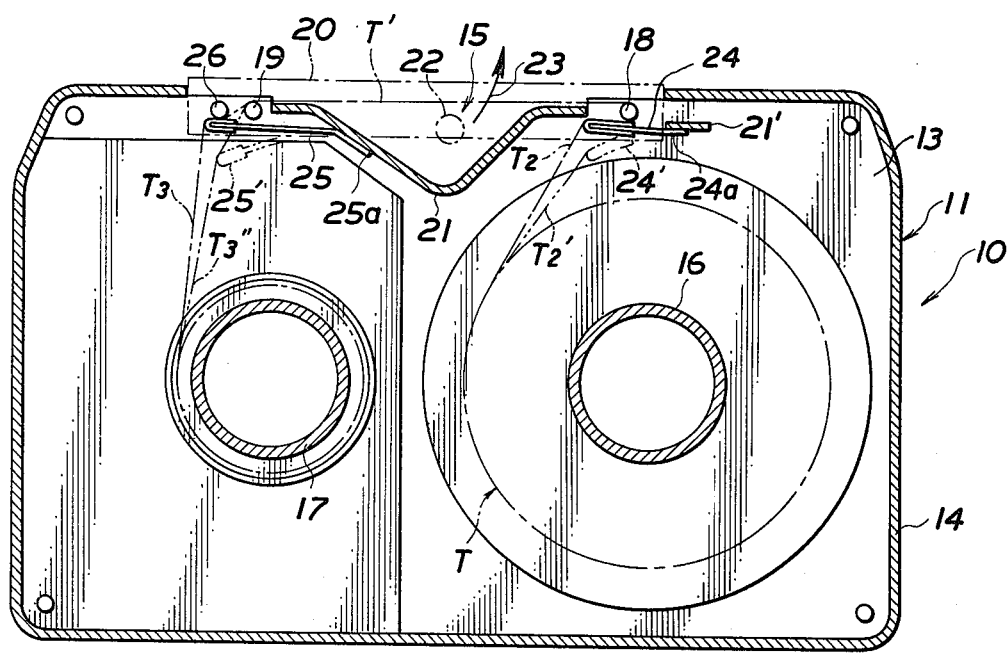
FIG. 2 is a plan view of the cassette of FIG. 1 with its top wall cut away to expose the brake assembly incorporated therein according to the prior art.

Referring to FIG. 5, it will be seen that, in the embodiment of the present invention there illustrated, elements corresponding to those described above with reference to FIGS. 1–4 are identified by the same reference numerals.

The tape cassette 10 of the present invention, as shown in FIG. 5, has a housing 11 divided into a top half 11' and a bottom half 11". The housing 11 is preferably of a flat, substantially rectangular configuration which may be formed of a suitable plastic, and consists of a top wall 12 (not shown on FIG. 5), a bottom wall 13 and a peripheral wall 14 joining the margins of top and bottom walls 12 and 13. The peripheral wall 14 and adjacent portions of top and bottom walls 12 and 13 are cut away along one relatively long side of rectangular housing 11 to define an elongated opening or cutout 15. Reels 16 and 17 are suitably located within cassette housing 11 so as to be freely rotatable in side-by-side relation, and a magnetic tape T is wound on reels 16 and 17 and is guided therebetween by guide pins 18 and 19 located adjacent the opposite ends of opening 15. Thus, a run T' of the magnetic tape extending between guide pins 18 and 19 runs along or traverses the opening 15 and may be engaged and withdrawn from cassette housing 11 through such opening as hereinafter described. The cassette housing 11 may further have a partition 21 extending between top and bottom walls 12 and 13 intermediate guide pins 18 and 19 along the edge of cutout or opening 15 in bottom wall 13 and being disposed inwardly or forwardly in respect to run T' of the magnetic tape extending between guide pins 18 and 19.

In accordance with the present invention, excessive looseness or slackness in tape run T' by reason of free rotation of reels 16, 17 is prevented by the resiliently flexible elements 100, 102, which are respectively associated with a tape portion X1 between guide pin 19 and a support member 104, such as a roller, and with the tape portion X2 between guide pin 18 and a support member 106, such as a roller. The free end 100' of the resiliently flexible element 100 normally urges tape portion X1 into pressing contact with a portion of the outer surface of support member 104 and, thus, normally provides braking action to the tape from reel 16. Similarly, the free end 102' of the resiliently flexible element 102 normally urges tape portion X2 into pressing contact with a portion of the outer surface of the support member 106 and, thus, normally provides braking action to the tape from reel 17. When, however, tension is applied to tape portion T', for example, during loading, recording, or reproduction, so as to draw the tape portion T' away from opening 15, tape portion X1 draws free end 100' away from pressing contact with support member 104 and tape portion X2 draws free end 102' away from pressing contact with support member 106. Thus, the drawing of tape portion T' away from opening 15 automatically causes free ends 100', 102' to no longer be in pressing contact with their respective support members 104, 106, thus allowing the tape portion T' to be freely drawn out of the opening 15. In other words, free ends 100', 102' together with support members 104, 106 prevent excessive slackness in the tape portion T' when the cassette 10 is removed from the magnetic recording and/or producing apparatus (not shown), and also provide automatic release of the tape T so that the tape T can be freely transferred between reels 16, 17 when the tape portion T' is drawn out of the opening 15 during the loading, recording and reproducing operations.

In accordance with the present invention, the fixed end 100" of resiliently flexible member 100 and the fixed end 102" of the resiliently flexible member 102 are not attached by cement or adhesive to a partition provided within the cassette housing 11, as is the case in the conventional cassette 10 discussed above. Instead, as is discussed in detail below, the fixed ends 100" and 102" are slidably disposed in respective holders 110, 112, as shown in FIG. 5. The use of holders 110, 112 instead of cement or adhesive substantially eliminates all of the deficiencies produced thereby.

The first embodiment of the holder 110 or of the holder 112 is shown in FIG. 6. Because holders 110 and 112 are identical in configuration in the first embodiment, only holder 110 is described. Holder 110 includes a wall 120, a wall 122, an end wall 124, and a bottom wall 126. Walls 120, 122 are arranged so as to be substantially parallel and to define a relatively wide gap therebetween. A projection 128 is provided along the inner surface of wall 120 facing wall 122, and defines a narrow gap, the thickness of which is, for example, substantially equivalent to the thickness of the flexibly resilient member 100 at the fixed end 100". Similarly, a projection 130 is provided along the inner surface of wall 122 facing wall 120, and defines a narrow gap, the thicknss of which is, for example, substantially equivalent to the thickness of the flexibly resilient member 100 at the fixed end 100". A tang 132 is provided on the inner surface of bottom wall 126 adjacent end wall 124 and extends upwardly, as shown best in FIG. 7.

The first embodiment of the resiliently flexible elements 100, 102 adapted to be slideably disposed within the first embodiment of holder 110 is shown in side view in FIG. 8 and in top plan view in FIG. 9. Because resiliently flexible elements 100, 102 are identical in configuration in the first embodiment, only resiliently flexible element 100 is described. As shown in FIGS. 8 and 9, resiliently flexible elements 100 is provided at the top of its fixed end portion 100" with a cut-away portion 135', and is provided at the bottom of fixed end portion 100" with a cut-away portion 135". The area of the cut-away portion 135" must be substantially equal to or slightly greater than the cross-section of tang 132, as is described in detail below.

Resiliently flexible element 100 may be formed from a strip of suitably resilient plastic, such as, polyester resin, or of a spring metal which is relatively highly flexible. A or coating 138 exhibiting a low coefficient of friction is disposed along the two outer side surfaces of the free portion 100' of resiliently flexible element 100. Suitable materials for coating 138 include polytetrafluoroethylene, etc., or materials containing carbon or gaphite. The material 138 is suitably attached to or pressed onto free end portion 100' using an adhesive, cement, heat or mechanically activated bonding technique, or the like.

As shown in FIG. 5, the first embodiment of holder 110 is attached at its bottom plate 126 to bottom wall 13 of the cassette housing 11 in a position adjacent support member 104 so that when resiliently flexible element 100 is slideable disposed at its fixed end 100' in holder 110, the free end 100' is normally urging tape portion X1 into pressing contact with a portion of the outer surface of support member 104. Because material 138 is provided at the free end 100' and is in physical contact with the tape portion X1, when tape portion T' is drawn away from opening 15, very little sliding friction is present between tape portion X1 and material 138, and, thus, the automatic release occurs at a low tension level.

Figure 20:
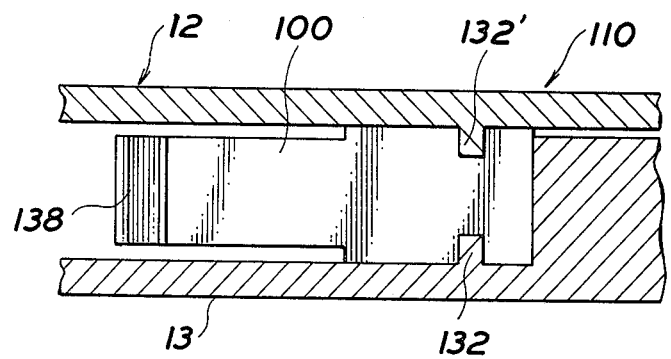
FIG. 20 is a partial cross-sectional view showing the relationship of the top wall of the cassette with respect to a top edge surface of the resiliently flexible element slidably disposed in a holder in accordance with this invention.

As shown in FIGS. 7 and 10, the first embodiment of resiliently flexible element 100 is slidably disposed at the fixed end portion 100" in the first embodiment of holder 110 in the gap between walls 120, 122. Specifically, fixed end portion 100" is disposed in the narrow gap between projection 128 and the inner surface of wall 122, and in the narrow gap between projection 130 and the inner surface of wall 120. In addition, tang 132 is engaged within cut-away portion 135", and the bottom edge of fixed end 100" is in contact with the top surface of bottom wall 126 and the end portion edge of fixed end 100" is in contact with the inner surface of end wall 124. As shown in FIG. 10, the narrow gaps defined by projections 128 and 130 do not fall within the same plane defined by fixed end portion 100" in its normal unflexed flat state. Thus, fixed end portion 100" must be flexed due to projections 128, 130 when it is slidably disposed within holder 110. This flexing of fixed end portion 100" acts to securely hold it in holder 110. In addition a tang 132' can be provided, if desired, on the inner surface of the top wall 12, as shown in FIG. 20, for engagement with the top cut-away portion 135' when the top wall 12 and the bottom wall 13 of cassette housing 11 are fastened together. In this case, the fixed end portion 100" of the first embodiment of the resiliently flexible element 100 is securely held in the first embodiment of holder 110 when top wall 12 is fastened to bottom wall 13 because of the physical contact of the edges of fixed end portion 100" with the adjacent walls, the flexing of the fixed end portion 100" by projections 128, 130, and the engagement between tang 132 and cut-away portion 135" and between tang 132' and cut-away portion 135'. It should be noted that the space between walls 120, 122 is substantially wider than the narrow gaps defined by the projections 128, 138, and this space permits the free end portion 100' of the resiliently flexible element 100 to be flexed, as shown in FIG. 10, between the normal braking position and the automatic release position. It is apparent that the major disadvantages inherent in the conventional approach where an adhesive or cement is used to fasten the fixed end is not present in present invention where the fixed end portion 100" is accurately positioned by slidably inserting the fixed end portion 100" of the first embodiment of the resiliently flexible element 100 into the first embodiment of the holder 110 according to the present invention.

An alternate version of the first embodiment of the resiliently flexible element 100 is shown in FIG. 11. Because the resiliently flexible elements 100, 102 are identical in configuration in this alternate embodiment, only resiliently flexible element 100 is described. The difference between the alternate embodiment shown in FIG. 11 and the first embodiment, as shown in FIG. 8, is that a pair of projections 140', 140 are provided instead of the cut-away portions 135', 135". Thus, a holder 110 in which the fixed end portion 100" having projection 140 is slidably disposed must be provided with a recess (not shown) along bottom wall 126 instead of tang 132. In addition, a recess must be provided in the top wall 12 of the cassette housing 11 instead of tang 132'.

A second alternate version of the first embodiment of the resiliently flexible element 100 is shown in FIG. 13. Because the resiliently flexible elements 100, 102 are identical in configuration in this second alternate embodiment, only resiliently flexible element 100 is described. The difference between the second alternate embodiment of FIG. 13 and the first embodiment, as shown in FIG. 8, is that a single projection 140 is provided instead of the cut-away portion 135". Thus, a holder 110 in which the fixed end portion 100" having a projection 140 (FIG. 13) is slidably disposed must be provided with a recess (not shown) along bottom wall 126 instead of tang 132.

The second embodiment of the resiliently flexible element 100 is shown in side view in FIG. 12. Because the resiliently flexible elements 100, 102 are identical in configuration in the second embodiment, only resiliently flexible element 100 is described. A cut-away portion 150 is provided at the bottom of the fixed end portion 100" in a fashion substantially similar to the cut-away portion 135' of the first embodiment of FIG. 8. In addition, material 138 is provided at the free end portion 100' to reduce the sliding coefficient of friction between the free end portion 100' and the tape T. The difference between the first and second embodiments is that in the second embodiment at least one cut-out portion 152 is provided in the resiliently flexible element 100 between the free end portion 100' and the fixed end portion 100". As shown in FIG. 12, a cut-out portion 152 is provided along the lower edge and a cut-out portion 152' is provided along the upper edge of the resiliently flexible element 100. The cut-out, portion 152, 152' allow the amount of tension on tape T' required to move the resiliently flexible element 100 between the normal braking position and the automatic release position to be changed or preselected.

The second embodiment of the holder 110 is shown in FIGS. 14–16. Because the configuration of holder 112 is an identical mirror image of holder 110, only holder 110 is described. Holder 110 of FIGS. 14–16 is formed from a block 160 provided with an arcuate gap defined by wall surfaces 162 and 164. The gap between wall surfaces 162 and 164 is greater than the thickness of the resiliently flexible element 100 that is slidably disposed therebetween, as shown in FIG. 16. The gap defined by wall surfaces 162 and 164 is opened at the top and at one end, and is closed at the other end by an end wall 162. A tang 132 is provided on the inside bottom surface of the gap adjacent end wall 162.

As stated above, resiliently flexible element 100 normally assumes a flat shape. Thus, because of the arcuate shape of the gap defined by wall surfaces 162 and 164, the resiliently flexible element 100 is held therein due to flexing, and cannot be pulled out because of the engagement of tang 132 with a cut-away portion in the resiliently flexible member 100.

Figure 22:
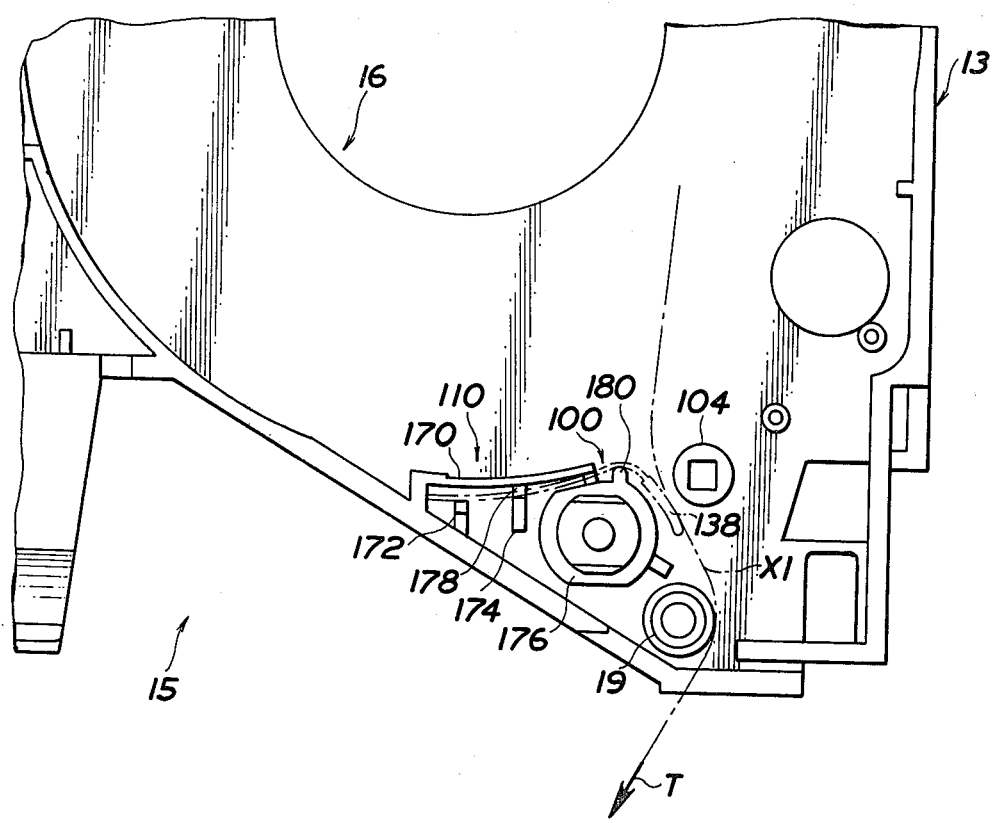
FIG. 22 is a detailed partial view of a cassette bottom half having an integral variation of the embodiment of the shown in FIGS. 14 and 15.

An alternate version of the second embodiment of holder 110 is shown in FIG. 22, and is formed integrally with the bottom wall 13 of the cassette housing 11. The alternate version of the second embodiment of holder 110 includes a wall 170 having an arcuate shape. The outer surface of wall 170 facing away from spool 16 corresponds to wall 162 of FIG. 14. The other surface in the alternate version of holder 110 is defined by the end surface of a member 172, the end surface of a member 174 and a flattened surface portion of a fastening member or boss 176. It should be noted that a tang 178 is provided between member 174 and the adjacent arcuate surface of wall 170. In addition, a projection 180 is provided on fastening member 176 adjacent the end of wall 170.

When the resiliently flexible element 100 is inserted into the alternate version of the second embodiment, as indicated by the dotted lines in FIG. 22, member 100 is flexed by the arcuate shape of wall 170 and by projection 180 and is prevented from being pulled out by the engagement of tang 178 with a corresponding cut-away portion in member 100. Thus, the free end portion of member 100 normally urges the tape portion X1 into pressing contact with support member 104, thereby to create the braking action. When the tape is drawn out of opening 15, however, the tension on tape portion X1 flexes member 100 away from support member 104, and tape portion X1 is in low-friction sliding engagement with material 138 on the free end portion of member 100, as shown in FIG. 22.

Figure 21:
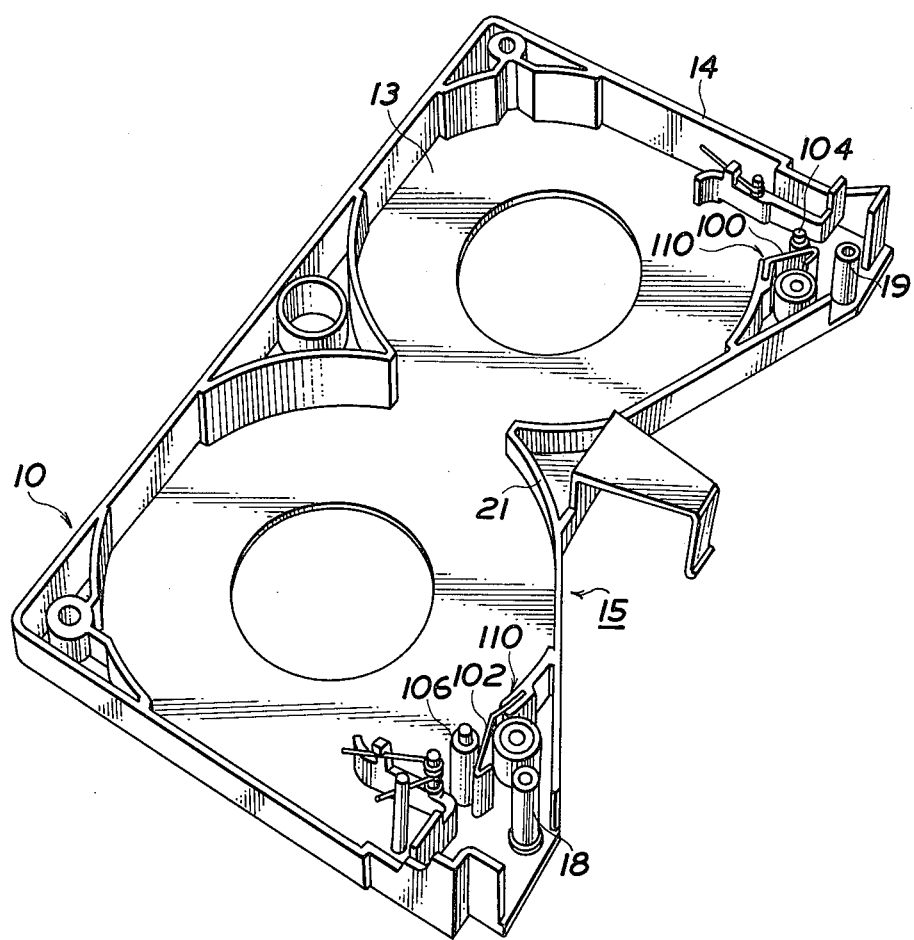
FIG. 21 is a perspective view of a cassette bottom half having holders of the type illustrated on FIGS. 14 and 15 and resiliently flexible elements in accordance with FIG. 17, 18 or 19.

A second alternate version of the second embodiment of holder 110 is shown in FIG. 21, and is formed integrally with the bottom wall 13 of the cassette housing 11.

Figure 17:
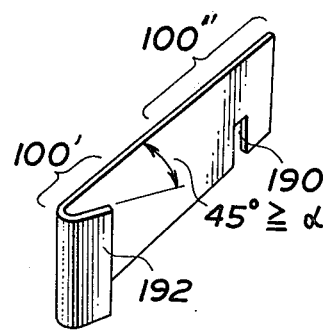
FIG. 17 is a perspective view of a third embodiment of the resiliently flexible element.

A third embodiment of the resiliently flexible element 100 is shown in FIG. 17. Because the configuration of resiliently flexible element 102 is identical to that of resiliently flexible element 100, only resiliently flexible element 100 is described. Element of FIG. 17 is bent around on itself at free end portion 100' so that the angle $\alpha$ defined between the bent around portion 192 and the balance of free end portion 100' satisfies the condition of $\alpha \leq 45°$. A cut-away portion 190 is provided at the bottom rear portion of the fixed end portion 100".

The resiliently flexible element 100 may itself be formed from a resilient material having carbon or graphite or other material which produces a low-coefficient of friction at the free end portion 100'. Thus, in the third embodiment of the resiliently flexible element 100 shown on FIG. 17, it is unnecessary to provide the material 138 because the low-coefficient of friction is inherent in the material used to fabricate the resiliently flexible element 100.

Figure 18:
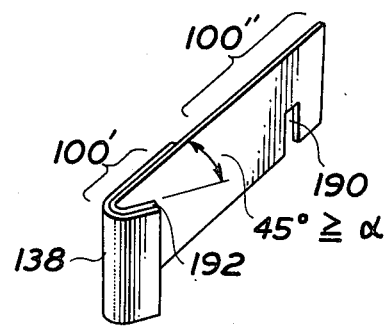
FIGS. 18 and 19 are perspective views of alternate versions of a fourth embodiment of the resiliently flexible element.

A fourth embodiment of the resiliently flexible element 100 is shown in FIG. 18. Because the configuration of resiliently flexible element 102 is identical to that of resiliently flexible element 100, only resiliently flexible element 100 is described. Like the third embodiment, the fourth embodiment has a bent around portion 192 at the free end that satisfies the condition of $\alpha \leq 45°$. A cut-away portion 190 is provided at the bottom rear portion of the fixed end 100". The difference between the third and fourth embodiments is that the material which is used to fabricate element 100 in FIG. 18 does not exhibit a sufficiently low coefficient of friction.

Figure 19:
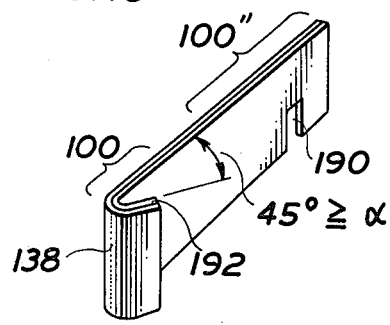

Thus, material 138 must be attached at least along the entire outer surface of the free end portion 100' and the bent around portion 192 in the embodiment shown in FIG. 18, or along the entire outer surface of element 100 including the bent around portion 192 in the embodiment shown in FIG. 19.

The third and fourth embodiments of the resiliently flexible elements 100, 102 shown on FIGS. 17-19 are, of course, to be, mounted in appropriate holders 110.

What is claimed is:

1. In a cassette for use in a magnetic recording and/or reproducing apparatus and which is of the type having a housing containing rotatable reels having magnetic tape wound thereon with said tape extending between said reels being guided to direct a run thereof across an access opening in said housing, the improvement comprising:
   support element means fixedly mounted to said housing adjacent one of said reels for sliding contact with a portion of said tape disposed between said adjacent reel and said access opening;
   a resiliently flexible element including a fixed end portion and a free end portion, said first resiliently flexible element having first engaging means on said fixed end portion; and
   holder means defining a gap for allowing said resiliently flexible element at said fixed end portion to be slidably disposed in said gap, said holder means being disposed in said housing adjacent said support element means such that said free end portion normally urges said portion of said tape into pressing contact with said support element means, said holder means including,
   second engaging means disposed in said gap for engaging said first engaging means when said fixed end portion of said resiliently flexible element is slidably disposed in said gap so as to prevent sliding movement of said fixed end portion out of said gap in the direction of said free end portion.

2. The cassette as recited in claim 1, wherein said holder means includes a first wall and a second wall in substantially parallel facing relationship so as to define said gap therebetween, a bottom wall fixedly secured along the bottom edges of said first and second walls, a first projection fixedly extending from said first wall in said gap and defining with said second wall a first narrow gap whose width is at least as great as the width of said fixed end portion, and a second projection fixedly extending from said second wall in said gap and defining with said first wall a second narrow gap whose width is at least as great as the width of said fixed end portion.

3. The cassette as recited in claim 2, wherein said second engaging means includes a tang fixedly secured to said holder means in said gap, and wherein said first engaging means includes a cut-away portion in said fixed end portion adapted to be engaged by said tang in a direction substantially at right angles to that in which said fixed end portion is slidably disposed in said gap.

4. The cassette as recited in claim 2, wherein said second engaging means includes a recessed portion fixedly secured to said holder means in said gap, and wherein said first engaging means includes a projection on said fixed end portion adapted to be engaged with said recessed portion in a direction substantially at right angles to that in which said fixed end portion is slidably disposed in said gap.

5. The cassette as recited in claim 1, wherein said first holder means includes a first wall and a second wall in substantially arcuate facing relationship so as to define said gap therebetween with a width greater than the width of said fixed end portion.

6. The cassette as recited in claim 5, wherein said second wall is composed of a plurality of spaced support members.

7. The cassette as recited in claim 6, wherein said second engaging means includes a tang fixedly secured to said holder means in said gap, and wherein said first engaging means includes a cut-away portion in which said fixed end portion adapted to be engaged by said tang in a direction substantially at right angles to that in which said fixed end portion is slidably disposed in said gap.

8. The cassette as recited in claim 6, wherein said second engaging means includes a recessed portion fixedly secured to said holder means in said gap, and wherein said first engaging means includes a projection on said fixed end portion adapted to be engaged with said recessed portion in a direction substantially at right angles to that in which said fixed end portion is slidably disposed in said gap.

9. The cassette as recited in claim 5, wherein said second engaging means includes a tang fixedly secured to said holder means in said gap, and wherein said first engaging means includes a cut-away portion in said fixed end portion adapted to be engaged by said tang in a direction substantially at right angles to that in which said fixed end portion is slidably disposed in said gap.

10. The cassette as recited in claim 5, wherein said second engaging means includes a recessed portion fixedly secured to said holder means in said gap, and wherein said first engaging means includes a projection on said fixed end portion adapted to be engaged with said recessed portion in a direction substantially at right angles to that in which said fixed end portion is slidably disposed in said gap.

11. The cassette as recited in claim 1, wherein a portion of a top inner surface of said housing is disposed adjacent said gap so as to prevent said fixed end portion slidably disposed in said gap from moving out of said gap in the direction substantially perpendicular to the direction of said free end portion.

12. The cassette as recited in claim 1, further comprising means for providing a low coefficient of friction on at least said free end portion of the resiliently flexible element.

13. The cassette as recited in claim 1, wherein said resiliently flexible element is formed of a material selected from the group consisting of a resiliently flexible plastic, a spring metal, a resiliently flexible material containing carbon, and a resiliently flexible material containing graphite.

14. The cassette as recited in claim 1, wherein said resiliently flexible element is selected from the group consisting of a resiliently flexible material containing carbon and a resiliently flexible material containing graphite so that said free end portion has a low coefficient of friction.

15. The cassette as recited in claim 1, wherein said resiliently flexible element further includes at least one cut-away portion between said free end portion and said fixed end portion for preselecting the resilience of said resiliently flexible element.

16. The cassette as recited in claim 1, wherein said free end portion further includes a bent-around portion enclosing an angle α ranging up to 45°.

17. The cassette as recited in claim 12, wherein said low coefficient of friction means is a member selected from the group consisting of polytetrafluoroethylene, a resiliently flexible material containing carbon, and a resiliently flexible material containing graphite.

18. The cassette as recited in claim 1, wherein at least said free end portion of the resiliently flexible element has a low coefficient of friction, and said holder means is disposed so that, in response to tension in said portion of the tape, said free end portion of the resiliently flexible element is flexed away from said support element means to cause said portion of the tape to be in sliding contact with only said free end portion having a low coefficient of friction.

19. The cassette as recited in claim 18, wherein said gap of the holder means is shaped so that said fixed end portion of the resiliently flexible element is flexed when engaged therein to resist removal from said gap.

* * * * *